United States Patent
Endo et al.

(10) Patent No.: US 11,569,521 B2
(45) Date of Patent: Jan. 31, 2023

(54) METHOD FOR MANUFACTURING MEMBRANE ELECTRODE ASSEMBLY FOR FUEL CELL

(71) Applicant: TOYOTA JIDOSHA KABUSHIKI KAISHA, Toyota (JP)

(72) Inventors: Yoshito Endo, Aichi (JP); Katsuaki Tsuji, Toyota (JP); Noriaki Kitajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 16/833,944

(22) Filed: Mar. 30, 2020

(65) Prior Publication Data

US 2020/0328444 A1     Oct. 15, 2020

(30) Foreign Application Priority Data

Apr. 9, 2019   (JP) .............................. JP2019-074010

(51) Int. Cl.
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8828* (2013.01)

(58) Field of Classification Search
None
See application file for complete search history.

(56) References Cited

U.S. PATENT DOCUMENTS

| | | |
|---|---|---|
| 10,205,174 B2 | 2/2019 | Fukuta et al. |
| 2011/0262828 A1 | 10/2011 | Noda et al. |
| 2015/0318560 A1 | 11/2015 | Kaneko et al. |

FOREIGN PATENT DOCUMENTS

| | | |
|---|---|---|
| CN | 105814722 A | 7/2016 |
| JP | 2009266481 A | 11/2009 |
| JP | 2013030286 A | 2/2013 |
| JP | 2013093166 A | 5/2013 |
| JP | 2015055555 A | 3/2015 |
| JP | 2015536529 A | 12/2015 |
| JP | 2017177679 A | 10/2017 |
| KR | 20090060563 A | 6/2009 |

*Primary Examiner* — Sarah A. Slifka
(74) *Attorney, Agent, or Firm* — Dickinson Wright, PLLC (57) ABSTRACT

The present disclosure provides a method for manufacturing a membrane electrode assembly for a fuel cell in which a transfer failure is suppressed. The present disclosure relates to a method for manufacturing a membrane electrode assembly for a fuel cell, which comprises intermittently applying a catalyst ink on a substrate sheet and drying the catalyst ink to form a catalyst layer on the substrate sheet, and transferring the catalyst layer from the substrate sheet onto an electrolyte membrane. The catalyst ink contains catalyst particles, an ionomer, an alcohol, and water, and a water content in the catalyst ink is 57% to 61% by weight of a total weight of the catalyst ink.

4 Claims, 6 Drawing Sheets

METHOD FOR MANUFACTURING MEMBRANE ELECTRODE ASSEMBLY FOR FUEL CELL

CROSS REFERENCE TO RELATED APPLICATIONS

The present application claims priority from Japanese patent application JP 2019-074010 filed on Apr. 9, 2019, the content of which is hereby incorporated by reference into this application.

BACKGROUND

Technical Field

The present disclosure relates to a method for manufacturing a membrane electrode assembly for a fuel cell.

Background Art

A fuel cell directly converts chemical energy possessed by a substance into electric energy by causing an electrochemical reaction by supplying respective reaction gases (fuel gas and oxidant gas) to a pair of catalytic electrodes disposed interposing an electrolyte membrane.

The membrane electrode assembly as a constituting member of a solid polymer fuel cell has a configuration in which catalyst layers are laminated on both surfaces of a polymer electrolyte membrane. There is known, for example, a method that transfers the catalyst layer onto the electrolyte membrane by overlaying and heat pressing a substrate sheet on which the catalyst layer is formed onto the electrolyte membrane as one of the methods for manufacturing the membrane electrode assembly. The catalyst layer is, for example, formed on the substrate sheet by applying a catalyst ink on the substrate sheet and drying it.

JP 2015-55555 A discloses a method for inspecting a fuel cell catalyst coated membrane. As disclosed in JP 2015-55555 A, when the catalyst layer is transferred onto the electrolyte membrane from the substrate sheet, the catalyst layer, in some cases, remains on the substrate sheet to cause a transfer failure.

JP 2017-177679 A discloses a release film that has a release layer on at least one surface of a polyester film and has a storage elastic modulus within a certain range. JP 2017-177679 A discloses that use of this release film ensures the suppressed transfer failure.

Here, as the catalyst ink used in forming the catalyst layer, for example, there is known a catalyst ink that contains an aggregate of carbon supporting catalyst and an ionomer as one disclosed in JP 2013-30286 A. However, when the catalyst layer formed using the catalyst ink containing the ionomer is transferred on the electrolyte membrane from the substrate sheet, an end portion of the catalyst layer, in some cases, remains on the substrate sheet without being transferred to cause the transfer failure. This is inferred that, during drying the catalyst ink applied on the substrate sheet, a membrane thickness becomes thin at the end portion of the coating membrane to increase a vaporizing speed greater than that of a center portion of the coating membrane, and this causes the ionomer, which has an effect of glue, to easily flow from the center portion to the end portion dried earlier. As the result, the ionomer is segregated at the end portion of the coating membrane to cause the catalyst layer to be difficult to be separated.

SUMMARY

As described above, the conventional method for manufacturing a membrane electrode assembly for a fuel cell, in some cases, causes the transfer failure when the catalyst ink containing the ionomer is used. Accordingly, the present disclosure provides a method for manufacturing a membrane electrode assembly for a fuel cell in which the transfer failure is suppressed.

As a result of various studies on means to solve the problem, the inventors have found that making a water content in the catalyst ink fall within a certain range ensured suppressing a transfer failure in a production of a membrane electrode assembly for a fuel cell, and thus, have completed the present disclosure.

That is, the gist of the present disclosure is as follows.

(1) A method for manufacturing a membrane electrode assembly for a fuel cell, the method comprising:
   intermittently applying a catalyst ink on a substrate sheet and drying the catalyst ink to form a catalyst layer on the substrate sheet; and
   transferring the catalyst layer from the substrate sheet onto an electrolyte membrane,
   wherein the catalyst ink contains catalyst particles, an ionomer, an alcohol, and water, and a water content in the catalyst ink is 57% to 61% by weight of a total weight of the catalyst ink.

(2) The method for manufacturing a membrane electrode assembly for a fuel cell according to (1), wherein a part of the ionomer is adsorbed to the catalyst particles in the catalyst ink, and an amount of the ionomer not adsorbed to the catalyst particles is equal to or less than 15 mg per 1 g of the catalyst ink.

The present disclosure ensures providing a method for manufacturing a membrane electrode assembly for a fuel cell in which a transfer failure is suppressed.

DETAILED DESCRIPTION

The following describes an embodiment of the present disclosure in details.

Figure 1:
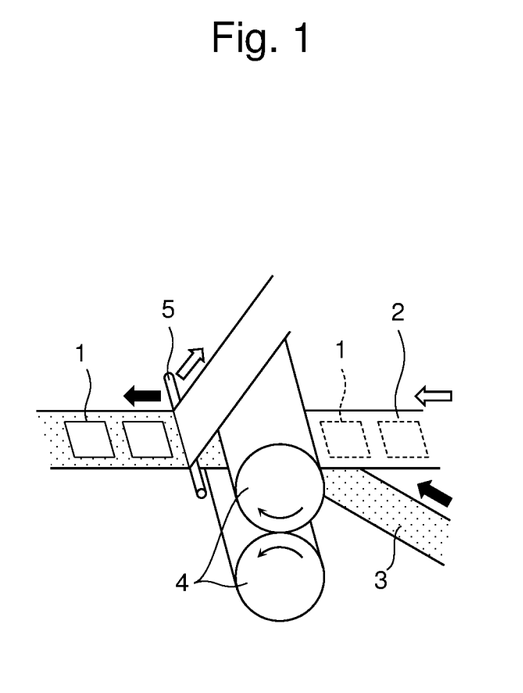
FIG. 1 is a schematic diagram illustrating one embodiment of a method for manufacturing a membrane electrode assembly according to the present disclosure.

The present disclosure relates to a method for manufacturing a membrane electrode assembly for a fuel cell in which a catalyst layer formed on a substrate sheet is transferred onto an electrolyte membrane. The membrane electrode assembly has a configuration in which the catalyst layers are laminated on both surfaces of the electrolyte membrane. FIG. 1 illustrates one embodiment of the method for manufacturing the membrane electrode assembly of the present disclosure. In the one embodiment of the present disclosure, as illustrated in FIG. 1, a substrate sheet 2 on which catalyst layers 1 are formed is prepared. A surface of this substrate sheet 2 on which the catalyst layers 1 are formed is caused to face an electrolyte membrane 3, and they are pressurized and heated using a heating roll 4, thereby transferring the catalyst layers 1 formed on the substrate sheet 2 onto the electrolyte membrane 3. After the transfer, a separation bar 5 separates the catalyst layers 1 from the substrate sheet 2. With the manufacturing method of the present disclosure, no catalyst layer remains on the substrate sheet after the separation, thereby causing no transfer failure.

Specifically, the method for manufacturing the membrane electrode assembly of the present disclosure comprises a first step of intermittently applying a catalyst ink on the substrate sheet and drying the catalyst ink to form the catalyst layer on the substrate sheet, and a second step of transferring the catalyst layer from the substrate sheet onto the electrolyte membrane. In the present disclosure, making a water content of the catalyst ink fall within a certain range ensures suppressing the transfer failure.

In the first step of the manufacturing method of the present disclosure, the catalyst ink is intermittently applied on the substrate sheet, and dried to form the catalyst layers on the substrate sheet.

The substrate sheet is not specifically limited, and, for example, a sheet-shaped solid polymer material can be used. As the solid polymer material, a polymer material high in release property and high in heat resistance can be used. The examples of the solid polymer material include, for example, an olefin-based resin, such as polyethylene and polypropylene, polytetrafluoroethylene, tetrafluoroperfluoroalkyl vinyl ether copolymer, tetrafluoroethylene-hexafluoropropylene copolymer, ethylene-tetrafluoroethylene copolymer, polyethylene terephthalate, and polyethylene naphthalate, and, in some embodiments, the solid polymer material is polytetrafluoroethylene (PTFE; Teflon (registered trademark)).

The substrate sheet can be prepared, for example, as a roll-shaped sheet with a width of approximately 150 mm to 500 mm.

The catalyst ink contains catalyst particles, an ionomer, an alcohol, and water. The catalyst ink may be a dispersion liquid in which the catalyst particles and the ionomer are dispersed in the alcohol and the water as the dispersion medium.

The catalyst particles are not specifically limited, and, for example, platinum, ruthenium, palladium, iridium, iron, nickel, cobalt, tungsten, molybdenum, and their alloy can be used. From the aspect of output characteristics and durability, an alloy of platinum and cobalt may be used.

The catalyst particles may be used in a configuration of being supported by a carrier. The carrier that supports the catalyst particles is not specifically limited, and, for example, a carbon-based material can be used. The examples of the carbon-based material include, for example, carbon materials, such as carbon black, activated carbon, carbon nanotubes, carbon nanofibers, carbon nanohorns, and carbon balls, carbon compounds and the like typified by, for example, silicon carbide, and their mixture.

When the catalyst particles are used in the configuration of being supported by the carrier, a weight ratio of the catalyst particles to the carrier is, for example, 10:90 to 90:10, and may be 20:80 to 40:60.

A content of the catalyst particles in the catalyst ink is, for example, 1% to 5% by weight of the total weight of the catalyst ink. When the catalyst particles are used in the configuration of being supported by the carrier, a total content of the catalyst particles and the carrier is, for example, 2% to 10% by weight of the total weight of the catalyst ink, and may be 5% to 7% by weight of the total weight of the catalyst ink.

The ionomer is a synthetic resin made by high molecules aggregated using cohesive force by metal ions. The ionomer may be a polyelectrolyte having proton ($H^+$) conductivity. Specifically, the examples of the ionomer include, for example, a fluororesin material (for example, Nafion (registered trademark)) containing a sulfonic acid group, a sulfonated plastic-based electrolyte, such as sulfonated polyether ketone, sulfonated polyethersulfone, sulfonated polyether ether sulfone, sulfonated polysulfone, sulfonated polysulfide, and sulfonated polyphenylene, and a sulfoalkylated plastic-based electrolyte, such as sulfoalkylated polyether ether ketone, sulfoalkylated polyethersulfone, sulfoalkylated polyetherethersulfone, sulfoalkylated polysulfone, sulfoalkylated polysulfide, and sulfoalkylated polyphenylene. From the aspect of durability, a perfluorosulfonic acid resin material may be used.

A part of the ionomer may be adsorbed to the catalyst particles. An amount of the ionomer not adsorbed to the catalyst particles (hereinafter, also described as non-adsorbing ionomer) may be 45 mg or less per 1 g of the catalyst ink, and may be 15 mg or less. The amount of the non-adsorbing ionomer can be determined by filtering the catalyst ink with a filter having a predetermined hole diameter (for example, 0.3 μm to 0.5 μm), and measuring the weight of the ionomer contained in the filtrate by thermogravimetry. In the conventional method in which the water content in the catalyst ink is, for example, less than 57% by weight, it was necessary to make the amount of the non-adsorbing ionomer in the catalyst ink equal to or less than 15 mg/1 g of the catalyst ink in order to suppress the transfer failure. Meanwhile, in the present disclosure, making the water content in the catalyst ink fall within a certain range sufficiently reduces thin membrane portion at an end portion of the catalyst layer formed on the sheet to make a segregation of the ionomer difficult to be caused at the catalyst layer end portion. Therefore, even when the amount of the non-adsorbing ionomer in the catalyst ink is increased up to 45 mg/1 g of the catalyst ink, the transfer failure can be suppressed. Accordingly, with the method of the present disclosure, a limitation of the ionomer usage in the catalyst ink can be substantially relaxed. When the amount of the non-adsorbing ionomer in the catalyst ink is equal to or less than 15 mg/1 g of the catalyst ink, the amount of the non-adsorbing ionomer is sufficiently small, thereby ensuring further suppressed transfer failure.

The content of the ionomer in the catalyst ink is, for example, 2% to 10% by weight of the total weight of the catalyst ink, and may be 3.5% to 5.0% by weight of the total weight of the catalyst ink.

The alcohol is not specifically limited, and the examples of the alcohol include, for example, $C_1$ to $C_4$ alkyl alcohol and their mixture. The alcohol may be ethanol, 1-propanol, 2-propanol, and their mixture.

The content of the alcohol is, for example, 10% to 50% by weight of the total weight of the catalyst ink, and may be 29% to 33% by weight of the total weight of the catalyst ink.

The water content in the catalyst ink is 57% to 61% by weight of the total weight of the catalyst ink, and may be 58% to 60% by weight of the total weight of the catalyst ink.

The water content in the catalyst ink of 57% by weight or more ensures suppressing thinning of the thickness at the end portion of the catalyst layer during drying the catalyst ink applied on the substrate sheet to decrease a difference between vaporizing speeds in the end portion and the center portion of the catalyst layer and accelerate the adsorption of the ionomer to the catalyst particles. These ensure suppressing the segregation of the ionomer at the end portion of the catalyst layer, and therefore, the end portion of the catalyst layer is easily separated from the substrate sheet, thereby ensuring the suppressed transfer failure from being caused. Furthermore, the water content in the catalyst ink of 57% by weight or more ensures suppressing the increase of the non-adsorbing ionomer in the catalyst ink over time, thereby extending a usable period of the catalyst ink. The water content in the catalyst ink of 61% by weight or less ensures suppressing foaming of the catalyst ink, thereby obtaining excellent coatability. Furthermore, the water content in the catalyst ink being 57% to 61% by weight makes viscosity of the catalyst ink fall within a range adapted for obtaining the excellent coatability. In the present disclosure, specifying the water content in the catalyst ink to fall within this range ensures obtaining both the suppressed transfer failure and the excellent coatability at the same time.

The catalyst ink may contain any other component, such as a water repellent agent, a dispersion auxiliary agent, a viscosity improver, and a pore-forming agent as necessary besides the above-described components. The content of any other component in the catalyst ink is usually 10% by weight or less of the total weight of the catalyst ink, and may be 5% by weight or less of the total weight of the catalyst ink.

The catalyst ink can be prepared by, for example, mixing the catalyst particles, the ionomer, the alcohol, the water, and the other component as necessary, and dispersing the catalyst particles and the ionomer in the alcohol and the water.

The catalyst ink is intermittently applied on the substrate sheet. While the catalyst ink may be intermittently applied at regular intervals or may be intermittently applied at different intervals, from the aspect of production efficiency, the catalyst ink may be intermittently applied at regular intervals. The catalyst ink can be applied with a method that ensures a uniform thickness application, and, for example, can be applied with a die coater method, a roll coater method, or the like. The catalyst ink is usually applied with a thickness of 0.05 mm to 0.15 mm. The catalyst ink may be applied into a rectangular shape, and is usually intermittently applied with a size of 150 mm to 250 mm×250 mm to 350 mm.

Subsequently, the catalyst ink applied on the substrate sheet is dried to form the catalyst layers on the substrate sheet. Drying is performed, for example, at 70° C. to 150° C. The drying time can be appropriately set depending on the drying temperature, and is, for example, one minute to ten minutes.

The formed catalyst layer may be in a rectangular shape, and usually has a size of 150 mm to 250 mm×250 mm to 350 mm. The thickness of the catalyst layer is usually 0.005 mm to 0.015 mm. In the manufacturing method of the present disclosure, since the difference between the thicknesses of the end portion and the center portion of the catalyst layer can be decreased, the segregation of the ionomer at the end portion of the catalyst layer can be suppressed, thereby ensuring suppressing the transfer failure from being caused. The width of the thin membrane portion at the end portion of the catalyst layer where the thickness is thinner than the thickness of the center portion of the catalyst layer may be 5 mm or less, may be 3 mm or less, and is 2 mm or less in some embodiments. Here, the width of the thin membrane portion means a width of the catalyst layer along the flow direction of the substrate sheet. When there are two or more such thin membrane portions in one catalyst layer, the width of the thin membrane portion is the larger width among those.

In the second step of the manufacturing method of the present disclosure, the catalyst layer is transferred onto the electrolyte membrane from the substrate sheet.

The electrolyte membrane is not specifically limited, and, for example, is a solid polymer electrolyte membrane having satisfactory proton conductivity in a wet state. As the electrolyte membrane, for example, a fluorine resin-based ion exchange membrane including a sulfonic acid group can be used, and Nafion (registered trademark) by DuPont de Nemours, Inc., Aciplex (registered trademark) by Asahi Kasei Corporation, FLEMION (registered trademark) by AGC Inc., and the like can be used. Note that the electrolyte membrane is not limited to the membrane including a sulfonic acid group, and a membrane including another ion exchange group (electrolyte component), such as a phosphate group and a carboxylic acid group, can be used.

The transfer of the catalyst layer from the substrate sheet onto the electrolyte membrane can be performed by, for example, causing the surface on which the catalyst layer of the substrate sheet is formed to face the electrolyte membrane, and heating and pressurizing from both sides. This step can be, for example, performed by a heat pressure transfer using a heating roll. After the transfer, the substrate sheet is separated from the catalyst layer.

It is only necessary that heating and pressurizing are performed at a temperature and a pressure that ensure transferring of the catalyst layer from the substrate sheet onto the electrolyte membrane. The heating temperature is usually 100° C. to 150° C., and the pressure is usually 0.3 MPa to 1 MPa.

While in the present disclosure, it is only necessary to perform the method including the first step and the second step described above on at least one of the surfaces of the electrolyte membrane, the method may be performed on both surfaces of the electrolyte membrane. When the method of the present disclosure is performed on one surface of the electrolyte membrane, an electrolyte membrane on which the catalyst layer has been preliminarily formed on one surface may be used, and the method of the present disclosure may be performed on the other surface of the electrolyte membrane, or an electrolyte membrane on which the catalyst layer is formed by performing the method of the present disclosure may be used and the catalyst layer may be formed on the other surface by another method.

The present disclosure ensures suppressing the transfer failure of the catalyst layer by using the catalyst ink having the water content of 57% to 61% by weight in the method for manufacturing the membrane electrode assembly in which the catalyst layer formed on the substrate sheet is transferred onto the electrolyte membrane. Accordingly, the present disclosure also includes a method for suppressing the transfer failure of the catalyst layer in the production of the membrane electrode assembly in which the catalyst layer formed on the substrate sheet is transferred onto the electrolyte membrane characterized by using the above-described catalyst ink. The present disclosure also relates to use of the above-described catalyst ink for suppressing the transfer failure of the catalyst layer in the production of the membrane electrode assembly in which the catalyst layer formed on the substrate sheet is transferred onto the electrolyte membrane.

The present disclosure also includes a method for manufacturing a fuel cell using the membrane electrode assembly manufactured in the above-described method. The method for manufacturing the fuel cell of the present disclosure includes manufacturing the membrane electrode assembly by the above-described method, overlaying the manufactured membrane electrode assembly with a gas diffusion layer, and sandwiching the obtained laminated body with a gas separator.

EXAMPLES

The following describes the present disclosure in further details using Example. However, the technical scope of the present disclosure is not limited to this example.

[Preparation of Catalyst Ink]

An alloy of platinum and cobalt supported by carbon black (hereinafter also described as catalyst-supported carbon) was used as the catalyst. An ionomer dispersion liquid (Nafion (registered trademark), MERCK, 20% concentration) was used as the ionomer.

6% by weight of the catalyst-supported carbon, 4% by weight of the ionomer, 59% by weight of water, and 31% by weight of ethanol were mixed and dispersed, and a catalyst ink having a water content of 59% by weight was prepared.

Catalyst inks having different water contents were prepared similarly to the catalyst ink having the water content of 59% by weight by adjusting the added water amounts. By adjusting the added ionomer dispersion liquid amount, the amount of the non-adsorbing ionomer not adsorbed to the catalyst-supported carbon was adjusted to fall within the range of 5 mg to 60 mg/1 g of the catalyst ink. The amount of the non-adsorbing ionomer in the catalyst ink was determined by filtering the catalyst ink with a filter having a hole diameter of 0.45 μm and measuring the ionomer weight contained in the filtrate by the thermogravimetry.

The catalyst ink was intermittently applied with a size of 180 mm×300 mm on a polytetrafluoroethylene (PTFE) sheet for transfer, dried at 70 to 150° C., and a catalyst layer applied roll on which the catalyst layers were formed on the PTFE sheet was manufactured. Afterwards, the catalyst layer surface of the catalyst layer applied roll was caused to face the surface of the electrolyte membrane (Nafion (registered trademark)), the catalyst layers and the electrolyte membrane were brought into contact, heating at 130° C. and pressurizing at 0.6 MPa were applied from both sides, and the catalyst layers were transferred onto the electrolyte membrane. Note that the production speed was constant at 5 m/minute.

[Relation Between Water Content in Catalyst Ink and Thin Membrane Portion at Catalyst Layer End Portion]

Figure 2:
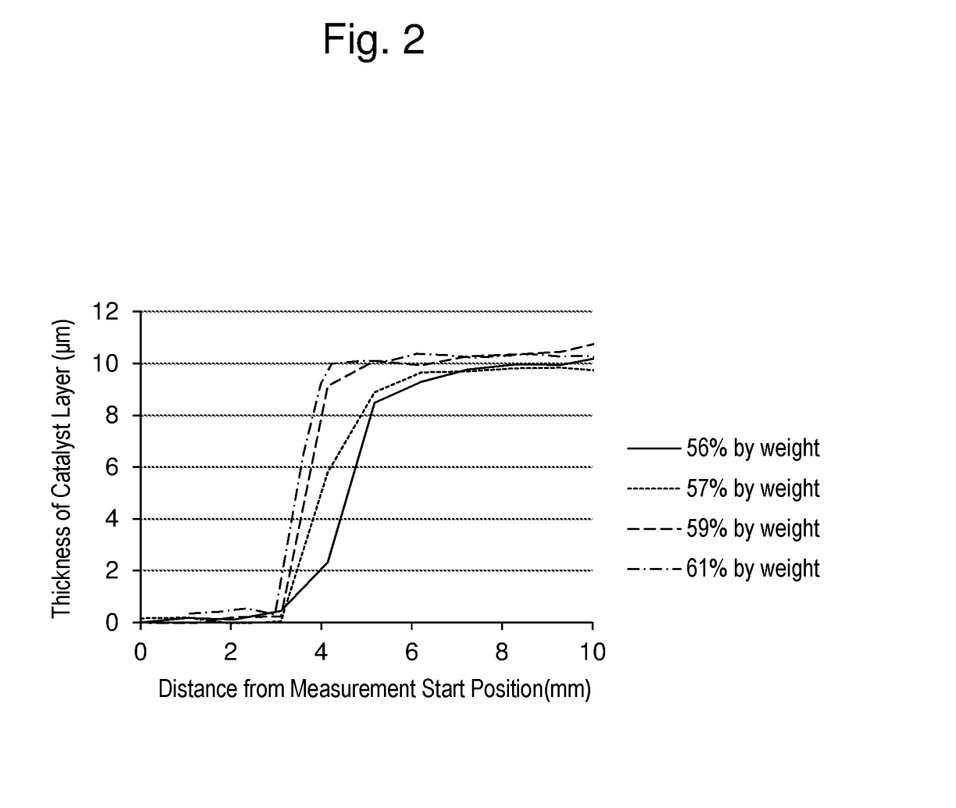
FIG. 2 is a drawing illustrating measurement results of thickness distributions of catalyst layers for catalyst inks having different water contents in Example.

One of the catalyst layers formed on the PTFE sheet was selected to measure a thickness distribution of the catalyst layer with a stylus-type film thickness measuring device. The thickness distribution of the catalyst layer was measured along the flow direction of the PTFE sheet. FIG. 2 illustrates measurement results of the thickness distributions of the catalyst layers for the catalyst inks having water contents of 56%, 57%, 59%, and 61% by weight. Note that, in FIG. 2, the thickness within the range up to 3 mm from the measurement start position corresponds to the thickness of the PTFE sheet, and the thickness within the range of 3 mm or more from the measurement start position corresponds to the thickness of the catalyst layer. As illustrated in FIG. 2, the thickness at the end portion of the catalyst layer was thinner than the thickness of the center portion. As the water content in the catalyst ink was increased, the thickness at the end portion of the catalyst layer thickened.

From data of the thickness distributions of the catalyst layers, widths of the thin membrane portions at the catalyst layer end portions whose thicknesses are thinner than 10 μm, which corresponds to the thickness of the center portion, were measured. The results are shown in Table 1. As shown in Table 1, as the water content in the catalyst ink was increased, the width of the thin membrane portion was decreased. The water content in the catalyst ink of 57% by weight or more made the width of the thin membrane portion equal to or less than 3 mm, which is in an intended range.

TABLE 1

| Water Content (% by weight) | Width of Thin Membrane Portion (mm) |
| --- | --- |
| 40 | 7.9 |
| 45 | 7.3 |
| 50 | 7 |
| 56 | 6 |
| 57 | 2.7 |
| 59 | 2 |
| 61 | 1.4 |
| 62 | 1.4 |
| 65 | 1.4 |
| 70 | 1.2 |

Figure 3:
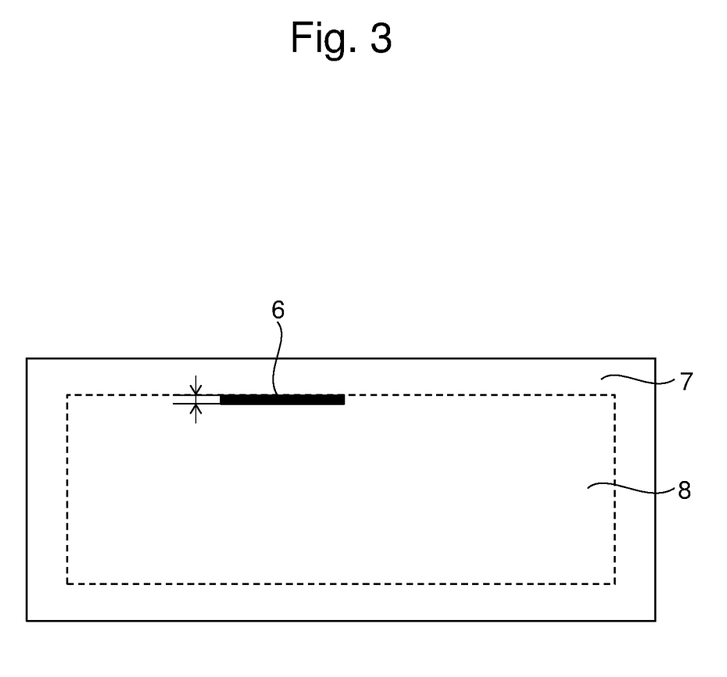
FIG. 3 is a schematic drawing illustrating a transfer failure portion of the catalyst layer in Example.

The transfer failures of the catalyst layers, when the respective catalyst inks having the water contents of 56%, 57%, 58%, and 59% by weight were used, were evaluated. Specifically, after the transfer of the catalyst layer from the PTFE sheet for transfer onto the electrolyte membrane, the widths (width in flow direction of sheet) of the transfer failure portions of the catalyst layers remained on the PTFE sheet for transfer were measured. FIG. 3 illustrates a schematic diagram of the transfer failure portion of the catalyst layer. In FIG. 3, a transfer failure portion 6 is a part of the catalyst layer remained on a catalyst layer applied portion 8 on a PTFE sheet for transfer 7 after the transfer. The width of the transfer failure portion 6 is a width of the portion indicated by the arrow in FIG. 3. The width of the transfer failure portion is a mean value. Table 2 shows measurement results of average widths of the transfer failure portions of the catalyst layers and the non-adsorbing ionomer amounts in the catalyst inks relative to the water contents in the catalyst inks.

TABLE 2

| Water Content (% by weight) | Average Width of Transfer Failure Portion (mm) | Non-Adsorbing Ionomer Amount (mg/1 g of Catalyst Ink) |
| --- | --- | --- |
| 56 | 0.22 | 17 |
| 57 | 0 | 13 |
| 59 | 0 | 10 |
| 61 | 0 | 9 |

Figure 4:
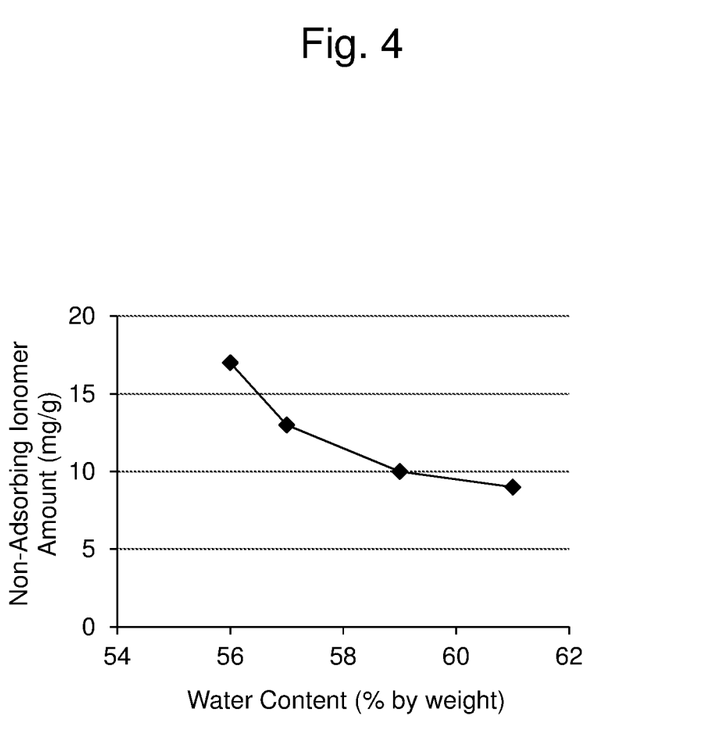
FIG. 4 is a drawing illustrating a relation between the water content in the catalyst ink and a non-adsorbing ionomer amount in Example.

As shown in Table 2, the water content in the catalyst ink being 57% by weight or more caused no transfer failure. FIG. 4 illustrates a relation between the water content in the catalyst ink and the non-adsorbing ionomer amount. As illustrated in Table 2 and FIG. 4, it was indicated that, as the water content in the catalyst ink was increased, the amount of the non-adsorbing ionomer was decreased, that is, the amount of the ionomer adsorbed to the catalyst-supported carbon was increased, to make it difficult to cause the transfer failure.

[Relation Between Non-Adsorbing Ionomer Amount and Transfer Failure]

Figure 5:
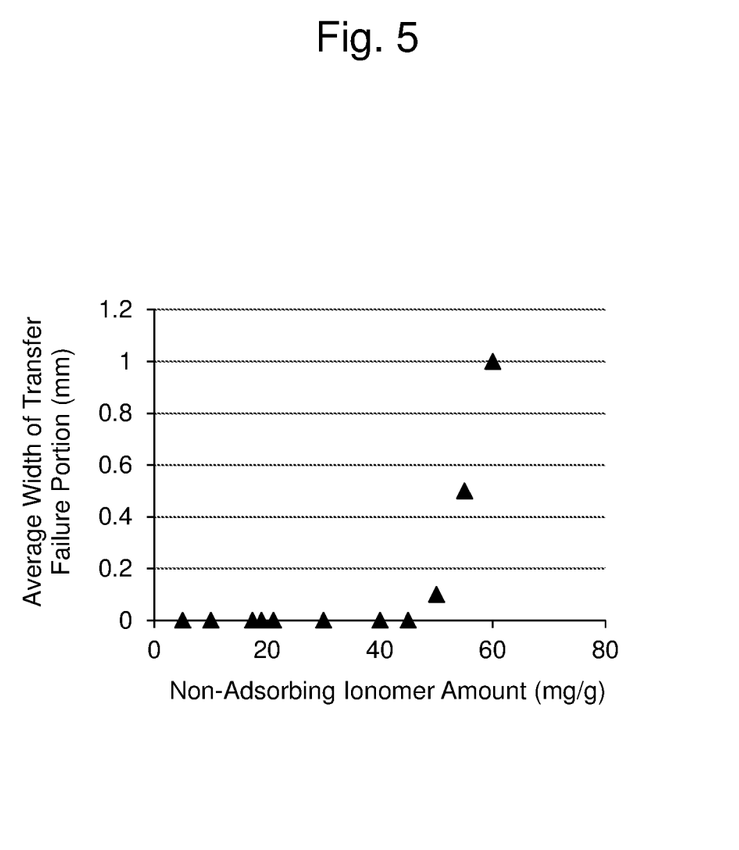
FIG. 5 is a drawing illustrating a relation between the non-adsorbing ionomer amount and an average width of the transfer failure portion of the catalyst layer in Example.

A relation between the non-adsorbing ionomer amounts and the transfer failures were examined for catalyst inks having the water content of 59% by weight and different non-adsorbing ionomer amounts. The transfer failure was evaluated by measuring the width of the transfer failure portion of the catalyst layer remained on the PTFE sheet for transfer similarly to those described above. FIG. 5 illustrates a relation between the non-adsorbing ionomer amount and the average width of the transfer failure portion of the catalyst layer. While the transfer failure was caused with the non-adsorbing ionomer amount of 17 mg/1 g of the catalyst ink (see Table 2) when the water content in the catalyst ink was 56% by weight, when the water content in the catalyst ink was 59% by weight, the thin membrane portion at the end portion of the catalyst layer was sufficiently reduced to make it difficult to cause the segregation of the ionomer at the catalyst layer end portion. Therefore, as illustrated in FIG. 5, even though the non-adsorbing ionomer amount in the catalyst ink was increased up to 45 mg/1 g of the catalyst ink, no transfer failure was caused. Accordingly, it was indicated that making the water content in the catalyst ink fall within a certain range substantially relaxes the limitation of the ionomer usage in the catalyst ink.

[Evaluation of Transfer Failure]

In Example 1, the catalyst ink having the water content of 59% by weight was used, and in Comparative Example 1, the catalyst ink having the water content of 56% by weight was used, to manufacture the catalyst layer applied rolls on which the catalyst layers were formed on the PTFE sheets for transfer, in a similar manner described above. Using these catalyst layer applied rolls, the catalyst layers were transferred onto the electrolyte membranes, and the evaluations of the transfer failures were performed. The results are shown in Table 3. As shown in Table 3, no transfer failure was caused in Example 1, and making the water content in the catalyst ink fall within the predetermined range of the present disclosure substantially suppressed the transfer failure.

TABLE 3

| | Total Number of Evaluations (Piece) | Number of Caused Transfer Failures (Piece) | Transfer Failure Rate (%) | Average Width of Transfer Failure Portion (mm) | Maximum Width of Transfer Failure Portion (mm) |
|---|---|---|---|---|---|
| Example 1 | 20000 | 0 | 0 | 0 | 0 |
| Comparative Example 1 | 20000 | 18200 | 91 | 0.8 | 2 |

[Foaming Test of Catalyst Ink]

Foaming tests were performed for catalyst inks having different water contents. The foaming tests were performed compliant with Japanese Industrial Standard K 2518. The results are shown in Table 4.

TABLE 4

| Water Content (% by weight) | Foam Ratio in Ink |
|---|---|
| 40 | 1 |
| 45 | 1 |
| 50 | 1 |
| 56 | 1 |
| 57 | 1 |
| 59 | 1 |
| 61 | 1 |

TABLE 4-continued

| Water Content (% by weight) | Foam Ratio in Ink |
|---|---|
| 62 | 1.1 |
| 65 | 1.5 |
| 70 | 2 |

As shown in Table 4, the water content in the catalyst ink being 62% by weight or more significantly increased foaming of the catalyst ink. Note that even though the ionomer amounts added to the catalyst ink were different, similar results were obtained.

[Change in Non-Adsorbing Ionomer Amount Over Time]

Figure 6:
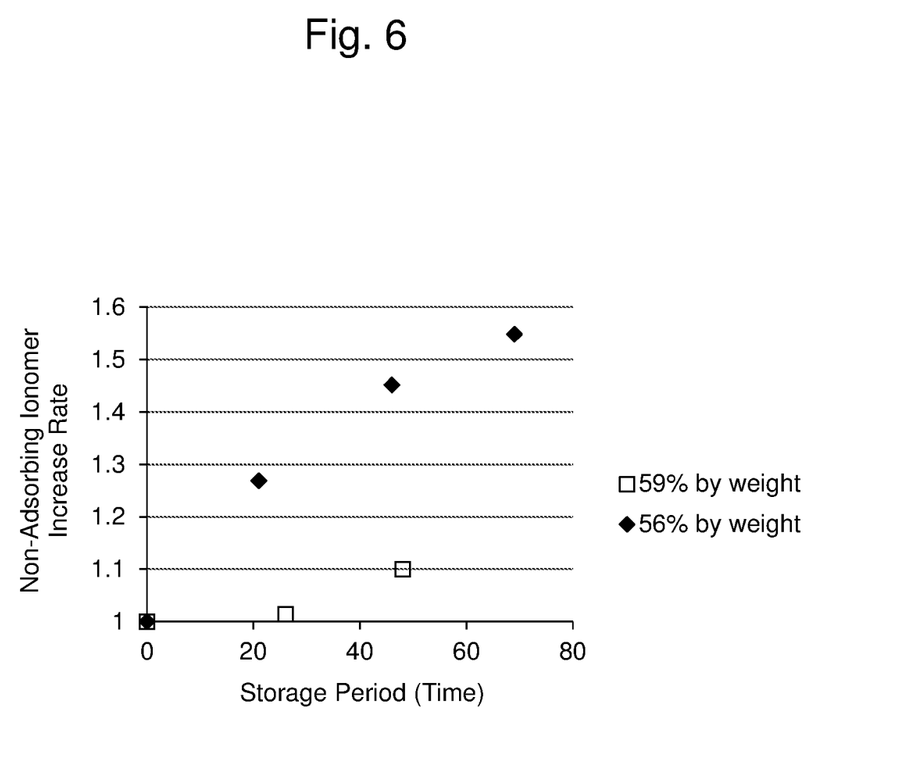
FIG. 6 is a drawing illustrating a relation between a storage period of the catalyst inks and increase rates of the non-adsorbing ionomer amounts in Example.

The non-adsorbing ionomer amounts in the catalyst inks when they were stored at 25° C. were measured over time for catalyst inks having water contents of 56% by weight and 59% by weight to obtain increase rates of the non-adsorbing ionomer amounts with respect to the time when the measurement started. The non-adsorbing ionomer amounts were measured as described above. FIG. 6 illustrates a relation between storage period of the catalyst inks and the increase rates of the non-adsorbing ionomer amounts. As illustrated in FIG. 6, the catalyst ink having the water content of 59% by weight had the increase rate of the non-adsorbing ionomer amount meaningfully small compared with the catalyst ink having the water content of 56% by weight, and was stable over time.

DESCRIPTION OF SYMBOLS

1 Catalyst layer
2 Substrate sheet
3 Electrolyte membrane
4 Heating roll
5 Separation bar
6 Transfer failure portion
7 PTFE sheet for transfer
8 Catalyst layer applied portion All publications, patents, and patent applications cited in this specification are intended to be incorporated herein by reference in their entirety.

What is claimed is:

1. A method for manufacturing a membrane electrode assembly for a fuel cell, the method comprising:
   intermittently applying a catalyst ink on a substrate sheet and drying the catalyst ink to form a catalyst layer on the substrate sheet; and
   transferring the catalyst layer from the substrate sheet onto an electrolyte membrane,
   wherein the catalyst ink is a dispersion liquid in which catalyst particles and an ionomer are dispersed in a dispersion medium consisting of an alcohol and water,
   wherein the alcohol is ethanol, 1-propanol, 2-propanol, or a mixture thereof, and
   wherein a water content in the catalyst ink is 57% to 61% by weight of a total weight of the catalyst ink.

2. The method for manufacturing a membrane electrode assembly for a fuel cell according to claim 1,
wherein a part of the ionomer is adsorbed to the catalyst particles in the catalyst ink, and an amount of the ionomer not adsorbed to the catalyst particles is equal to or less than 15 mg per 1 g of the catalyst ink.

3. The method for manufacturing a membrane electrode assembly for a fuel cell according to claim 1, wherein the alcohol is ethanol.

4. The method for manufacturing a membrane electrode assembly for a fuel cell according to claim 1, wherein a content of the alcohol is 29% to 33% by weight of the total weight of the catalyst ink.

* * * * *